US008824267B2

(12) United States Patent
Cheng et al.

(10) Patent No.: US 8,824,267 B2
(45) Date of Patent: Sep. 2, 2014

(54) SYSTEMS AND METHODS FOR TRANSMIT DIVERSITY FOR DFT PRECODED CHANNELS

(75) Inventors: Jung-Fu Cheng, Fremont, CA (US); Robert Baldemair, Solna (SE); Dirk Gerstenberger, Stockholm (SE); Daniel Larsson, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 257 days.

(21) Appl. No.: 13/016,205

(22) Filed: Jan. 28, 2011

(65) Prior Publication Data

US 2012/0039158 A1 Feb. 16, 2012

Related U.S. Application Data

(60) Provisional application No. 61/373,531, filed on Aug. 13, 2010.

(51) Int. Cl.
*H04J 11/00* (2006.01)
(52) U.S. Cl.
USPC ........... 370/203; 370/208; 370/210; 370/329; 370/344
(58) Field of Classification Search
None
See application file for complete search history.

(56) References Cited

U.S. PATENT DOCUMENTS

| | | | | |
|---|---|---|---|---|
| 7,352,767 | B2 * | 4/2008 | Jang | 370/431 |
| 7,593,420 | B2 * | 9/2009 | Park et al. | 370/436 |
| 7,596,127 | B1 * | 9/2009 | May et al. | 370/343 |
| 7,652,980 | B2 * | 1/2010 | Henriksson et al. | 370/208 |
| 7,720,162 | B2 * | 5/2010 | Krishnamoorthi | 375/260 |
| 8,054,901 | B2 * | 11/2011 | Yonge et al. | 375/260 |
| 2010/0034312 | A1 | 2/2010 | Muharemovic et al. | |
| 2011/0134902 | A1 * | 6/2011 | Ko et al. | 370/344 |

FOREIGN PATENT DOCUMENTS

WO 2010018983 A2 2/2010

OTHER PUBLICATIONS

International Search Report and Written Opinion issued on Sep. 7, 2011 in International Application No. PCT/IB2011/051794, 10 pages.

* cited by examiner

*Primary Examiner* — Willie J Daniel, Jr.
(74) *Attorney, Agent, or Firm* — Rothwell, Figg, Ernst & Manbeck, P.C.

(57) ABSTRACT

A transmission method and apparatus that combines the benefits of DFT precoding and transmit diversity coding for PUCCH transmission. In one aspect, the invention provides an improved transmit diversity coding method and apparatus for DFTS-OFDM PUCCH with minimal impact on multiplexing capacity. In one embodiment, the improved transmit diversity method and apparatus has the feature of employing frequency-domain separation for the payload signals.

25 Claims, 10 Drawing Sheets

FIG. 4A

First Slot

FIG. 4B

Second Slot

SYSTEMS AND METHODS FOR TRANSMIT DIVERSITY FOR DFT PRECODED CHANNELS

This application claims the benefit of U.S. Provisional Patent Application No. 61/373,531, filed on Aug. 13, 2010, which is incorporated by reference herein.

TECHNICAL FIELD

The invention relates to transmit diversity for discrete Fourier transform (DFT) precoded channels.

BACKGROUND

Long-Term Evolution (LTE) uses orthogonal frequency-division multiplexing (OFDM) in the downlink and discrete Fourier transform (DFT) spread OFDM (DFTS-OFDM) in the uplink. DFTS-OFDM allows for flexible bandwidth assignment and orthogonal multiple access not only in the time domain, but also in the frequency domain. Thus, the LTE uplink scheme is also sometimes referred to as Single-Carrier FDMA (SC-FDMA). In the time domain, LTE downlink and uplink transmissions are organized into radio frames of 10 ms, each radio frame consisting of ten equally-sized subframes of length Tsubframe=1 ms. The resource allocation in LTE is typically described in terms of resource blocks, where a resource block corresponds to one slot (0.5 ms) (i.e., there are two slots per subframe) in the time domain and 12 contiguous subcarriers in the frequency domain.

To support the transmission of downlink and uplink transport channels, certain uplink layer 1 and layer 2 (L1/L2) control signaling is used. The uplink L1/L2 control signaling includes: (a) hybrid-automatic repeat request (HARQ) acknowledgements (ACK/NACK) for received downlink data; (b) channel-status reports related to downlink channel conditions, which reports may be used by the base station in scheduling the transmission of data in the downlink; and (c) scheduling requests indicating that the mobile terminal (a.k.a., "user equipment (UE)") needs uplink resources for uplink data transmissions. For example, after receiving downlink data in a subframe from a base station, the UE attempts to decode the data and reports to the base station whether the decoding was successful (ACK) or not (NACK). In case of an unsuccessful decoding attempt, the base station can retransmit the erroneous data.

A UE should transmit uplink L1/L2 control signaling regardless of whether or not the UE has any uplink transport-channel (UL-SCH) data to transmit and, thus, regardless of whether or not the UE has been assigned any uplink resources for UL-SCH data transmission. Hence, two different methods are used for the transmission of the uplink L1/L2 control signaling, depending on whether or not the UE has been assigned an uplink resource for UL-SCH data transmission.

In case the UE does not have a valid scheduling grant—that is, no resources have been assigned for UL-SCH in the current subframe—a separate physical channel, the Physical Uplink Control Channel (PUCCH), is used for transmission of uplink L1/L2 control signaling. Otherwise, the uplink L1/L2 control signaling is multiplexed with the coded UL-SCH onto the Physical Uplink Shared Channel (PUSCH).

More specifically, if the UE has not been assigned an uplink resource for data transmission, the L1/L2 control information (e.g., channel-status reports, HARQ acknowledgments, and scheduling requests) is transmitted in uplink resources (resource blocks) specifically assigned for the uplink L1/L2 control information on the PUCCH. These resources are located at the edges of the total available cell bandwidth. Each such resource consists of 12 "subcarriers" (one resource block) within each of the two slots of an uplink subframe.

LTE release-8 (Rel-8) has recently been standardized. LTE Rel-8 supports bandwidths up to 20 MHz. The Third Generation Partnership Project (3GPP) has initiated work on LTE release-10 (Rel-10). One of the parts of LTE Rel-10 is to support bandwidths larger than 20 MHz. One important requirement on LTE Rel-10 is to assure backward compatibility with LTE Rel-8. This should also include spectrum compatibility. That would imply that an LTE Rel-10 carrier, wider than 20 MHz, should appear as a number of LTE carriers to an LTE Rel-8 terminal. Each such carrier can be referred to as a Component Carrier (CC). In particular, for early LTE Rel-10 deployments, it can be expected that there will be a smaller number of LTE Rel-10-capable terminals compared to many LTE legacy terminals. Therefore, it is necessary to assure an efficient use of a wide carrier also for legacy terminals, i.e. that it is possible to implement carriers where legacy terminals can be scheduled in all parts of the wideband LTE Rel-10 carrier. The straightforward way to obtain this would be by means of Carrier Aggregation (CA). CA implies that an LTE Rel-10 terminal can receive multiple CCs, where the CCs have, or, at the least, have the possibility to have, the same structure as a Rel-8 carrier.

The CA PUCCH is based on DFTS-OFDM for a UE supporting more than 4 ACK/NACK bits. The multiple ACK/NACK bits (may also include scheduling request (SR) bits) are encoded to form 48 coded bits. The 48 coded bits are then scrambled with cell-specific (and possibly DFTS-OFDM symbol dependent) sequences. The first 24 bits are transmitted within the one slot and the other 24 bits are transmitted within a second slot. The 24 bits per slot are converted into 12 QPSK symbols, spread across five DFTS-OFDM symbols, DFT precoded and transmitted within one resource block (bandwidth) and five DFTS-OFDM symbols (time). The spreading sequence is UE specific and enables multiplexing of up to five users within the same resource block. A demodulation reference signal is also transmitted in each slot. The reference signal comprises a reference sequence. As used herein, a "reference sequence" may represent any information transmitted by a transmitting device to permit or otherwise facilitate the demodulation, by a receiving device, of data associated with the reference sequence (e.g., data transmitted with the reference sequence). For example, in particular embodiments, the reference sequence may represent a cyclic shifted CAZAC sequence (e.g., the computer optimized sequences in 3GPP TS 36.211). To improve orthogonality among reference signals even further, an orthogonal cover code of length two can be applied to the reference signals.

In the continuing evolution of the LTE system, additional transmit antennas are introduced to the UE to improve transmission performance. There is, hence, a need to design transmission methods and apparatuses that combine the benefits of DFT precoding and transmit diversity coding for PUCCH transmission (including CA PUCCH transmission).

SUMMARY

In one aspect, particular embodiments of the disclosed solution provide a transmission method and apparatus that combines the benefits of DFT precoding and transmit diversity coding for PUCCH transmission. For example, particular embodiments provide an improved transmit diversity coding method and apparatus for DFTS-OFDM PUCCH with minimal impact on multiplexing capacity. In certain embodiments, the improved transmit diversity method and apparatus has the feature of employing frequency-domain separation for the payload signals as well as the time-domain orthogonal spreading separation and/or sequence phase shift separation.

In one embodiment, a transmit diversity coding method for DFT precoded channels (e.g., DFTS-OFDM PUCCH) includes producing a block of data symbols and transforming the block of data symbols to produce a first block of transformed symbols and a second block of transformed symbols. A first antenna of a mobile terminal is used to transmit, during a slot of a subframe of a radio frame and using only a first set of subcarriers, the first block of transformed symbols. The first antenna is also used to transmit a first reference sequence during the same slot. A second antenna of the mobile terminal is used to transmit, during the same slot and using only a second set of subcarriers, the second block of transformed symbols. The second antenna is also used to transmit a second reference sequence during the same slot. To enhance signal diversity, the first set of subcarriers is orthogonal with the second set of subcarriers. Additionally, the first reference sequence and the second reference sequence may be transmitted using a third set of subcarriers that comprises that first set of subcarriers and the second set of subcarriers.

In some embodiments, the method also includes producing a second block of data symbols and transforming the second block of data symbols to produce a third block of transformed symbols and a fourth block of transformed symbols. In these embodiments, the method also includes (i) using the first antenna to transmit, during a second slot of the subframe, the third block of transformed symbols and the first reference sequence, and (ii) using the second antenna to transmit, during the second slot, the fourth block of transformed symbols and the second reference sequence. The third block of transformed symbols may be transmitted using a fourth set of subcarriers and the fourth block of transformed symbols may be transmitted using a fifth set of subcarriers that is orthogonal with the fourth set of subcarriers. In some embodiments, the first and fifth sets of subcarriers consist only of even indexed subcarriers and the second and fourth sets of subcarriers consist only of odd indexed subcarriers. In other embodiments, the first and fifth sets of subcarriers consist only of odd indexed subcarriers and the second and fourth sets of subcarriers consist only of even indexed subcarriers.

In some embodiments, the first reference sequence may be orthogonal to the second reference sequence. For instance, the first reference sequence may be a cyclic shift of the second reference sequence.

In some embodiments, the step of transforming the block of data symbols includes the following steps: dividing the block of data symbols into at least a first sub-block and a second sub-block; applying a discrete Fourier transform (DFT) to the first sub-block to produce the first block of transformed symbols; and applying a discrete Fourier transform (DFT) to the second sub-block to produce the second block of transformed symbols.

In a particular embodiment, the block of data symbols consists of twelve data symbols. In this particular embodiment, the step of transforming the block of twelve data symbols may include: dividing the block of twelve symbols into first sub-block of six symbols and a second sub-block of six symbols; applying a DFT of size six to the first sub-block of six symbols to produce the first block of transformed symbols; and applying a DFT of size six to the second sub-block of six symbols to produce the second block of transformed symbols.

In some embodiments, the step of transmitting the first block of transformed symbols includes mapping each symbol within the first block of transformed symbols to a particular subcarrier within the first set of subcarriers and applying an inverse fast Fourier transform (IFFT) to the first block of transformed symbols. Similarly, the step of transmitting the second block of transformed symbols may include mapping each symbol within the second block of transformed symbols to a particular subcarrier within the second set of subcarriers and applying the IFFT to the second block of transformed symbols.

In one embodiment, a transmit diversity apparatus for discrete Fourier transform (DFT) precoded channels includes a first antenna, a second antenna, and a data processor coupled to the first antenna and the second antenna. The data processor is configured to: (a) produce a block of data symbols from a set of message bits, (b) transform the block of data symbols to produce a first block of transformed symbols and a second block of transformed symbols; (c) use the first antenna to transmit, during a slot of a subframe of a radio frame, the first block of transformed symbols and a first reference sequence; and (d) use the second antenna to transmit, during the slot, the second block of transformed symbols and a second reference sequence. The data processor may further be configured such that (i) the first block of transformed symbols is transmitted using a first set of subcarriers, (ii) the second block of transformed symbols is transmitted using a second set of subcarriers that is orthogonal with the first set of subcarriers, and (iii) the first reference sequence and the second reference sequence are transmitted using a third set of subcarriers that comprises that first set of subcarriers and the second set of subcarriers.

In another aspect, particular embodiments of the disclosed solution provide a mobile terminal comprising any one of the herein described transmit diversity apparatuses for discrete Fourier transform (DFT) precoded channels.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

FIGS. 3A,3B,4A, and 4B illustrate various subcarrier mappings according to particular embodiments.

DETAILED DESCRIPTION

Figure 1:
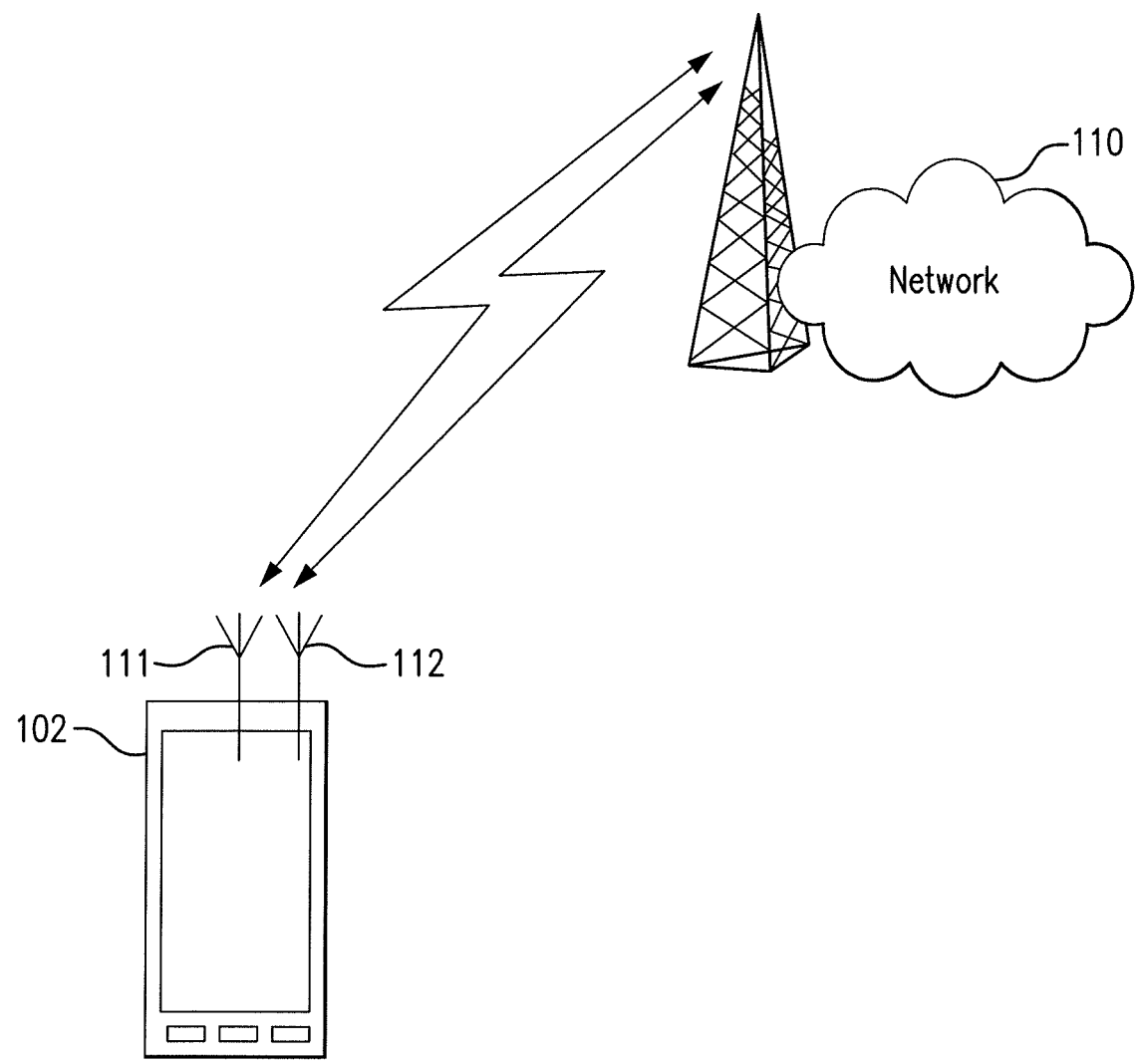
FIG. 1 illustrates a particular embodiment of a wireless communication system that supports transmit diversity coding for PUCCH transmissions.

Referring now to FIG. 1, FIG. 1 illustrates a mobile terminal 102 having multiple antennas (e.g., antenna 111 and antenna 112) and communicating wirelessly with a network 110. Particular embodiments of mobile terminal 102 provide an improved transmit diversity coding process for DFTS-OFDM PUCCH.

Figure 2:
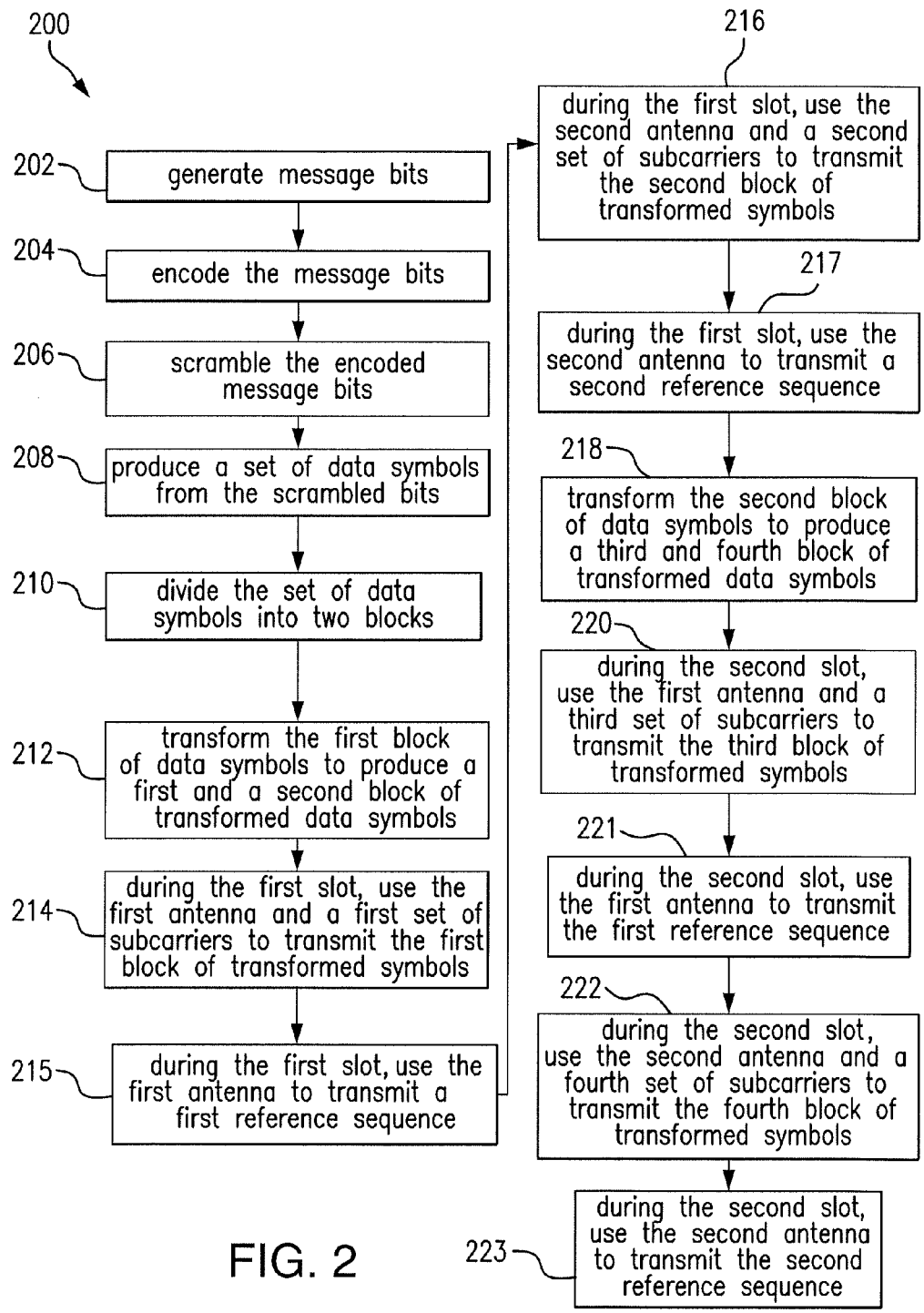
FIG. 2 is a flow chart illustrating a process for transmit diversity coding of DFTS-OFDM PUCCH.

Referring now to FIG. 2, FIG. 2 is a flow chart illustrating an example of such a process 200 that may be implemented by particular embodiments of mobile 102. Process 200 assumes that mobile terminal 102 includes only two antennas: antenna 111 and antenna 112, but the described solution is not limited to two antennas as more than two antennas can be used. Process 200 may begin in step 202 where a media-access control (MAC) layer of mobile terminal 102 generates message bits (e.g., control information such as ACK/NACK bits, ACK/NACK bits plus a scheduling request bit, etc.). In step 204, the message bits are encoded into a block of B bits (e.g., the message bits may be coded to form a block of 48 coded bits). In step 206, the block of coded bits is scrambled. In some embodiments, a block of coded bits may be scrambled using a cell-specific (and possible DFTS-OFDM symbol dependent) sequence to produce a block of B (e.g., B=48) scrambled bits $\tilde{b}(0), \tilde{b}(1), \ldots, \tilde{b}(B-1)$, according to $\tilde{b}(i)=(b(i)+c(i)) \mod 2$, where $i=0, 1, \ldots, B-1$ and the scrambling sequence $c(i)$ is given by section 7.2 of 3GPP TS 36.211. The scrambling sequence generator can for example be initialized with $c_{init}=\lfloor n_s/2 \rfloor \cdot 2^9 + N_{ID}^{cell}$ at the start of each subframe.

In step 208, a set of data symbols is produced from the block of scrambled bits. For example, in step 208, a first sub-set of the block of scrambled bits (e.g., 24 of the 48 bits) is used to produce a first block of N data symbols (e.g., 12 data symbols) and a second sub-set of the block of scrambled bits (e.g., the other 24 of the 48 bits) is used to produce a second block of N data symbols. In one embodiment, in step 208 the block of scrambled bits may be QPSK modulated to produce two blocks of complex-valued modulation symbols: $d(0), \ldots, d(N-1)$ and $d(N), \ldots, d(2N-1)$.

In step 210, the set of data symbols is divided into two blocks: a first block of data symbols (e.g., $d(0), \ldots, d(N-1)$) and a second block of data symbols (e.g., $d(N), \ldots, d(2N-1)$). The first block will be transmitted during the first slot of a subframe and the second bock will be transmitted during the second slot of the subframe.

In step 212, the first block of data symbols is transformed to produce DFT-precoded data (e.g., in some embodiments, prior to transforming the block of data symbols, each data symbol is multiplied by a value (w(i))). In particular embodiments, the first block of data symbols is transformed to produce a first block of transformed data symbols and a second block of transformed data symbols.

In step 214, an antenna 111 of mobile terminal 102 and a first set of subcarriers are used, during the first slot of the subframe, to transmit the first block of transformed data symbols. In step 215, antenna 111 is used, during the first slot of the subframe, to transmit a first reference sequence. In step 216, antenna 112 of mobile terminal 102 and a second set of subcarriers are used, during the first slot of the subframe, to transmit the second block of transformed data symbols. In step 217, antenna 112 is used, during the first slot of the subframe, to transmit a second reference sequence.

Figure 3A:
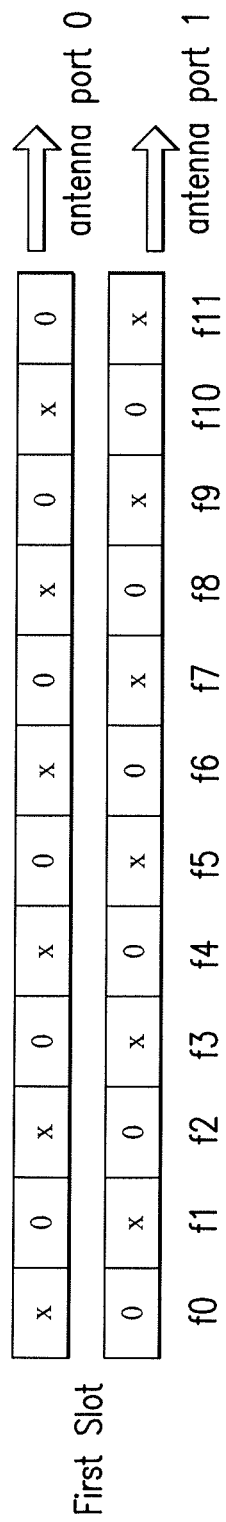

Advantageously, the first set of subcarriers is orthogonal with the second set of subcarriers. This is illustrated in FIG. 3A. As show in FIG. 3A, the even indexed subcarriers (i.e., f0, f2, . . . , f10) are used to transmit the first block of transformed data symbols, but the odd indexed subcarrier are set to zero, and the odd indexed subcarriers (i.e., f1, f3, . . . , f11) are used to transmit the second block of transformed data symbols, but the even indexed subcarrier are set to zero (in the example, antenna port 0 corresponds to antenna 111 and antenna port 1 corresponds to antenna 112).

This provides the feature of frequency-domain separation for the payload signals (i.e., the first and second blocks of transformed data symbols) and time-domain orthogonal spreading separation and/or sequence phase shift separation. In steps 215 and 217, the reference sequences may be transmitted using all of the twelve available subcarriers. In this case, the first reference sequence should be orthogonal with the second reference sequence. In an alternative embodiment, the reference sequences need not be orthogonal. In such embodiments, it would be advantageous to transmit the first reference sequences using a set of subcarriers and transmit the second reference sequences using a set of subcarriers that are orthogonal to the subcarriers used to transmit the first reference sequence.

In step 218, the second block of data symbols is transformed to produce DFT-precoded data. For example, the second block of data symbols is transformed to produce a third block of transformed data symbols and a fourth block of transformed data symbols. In step 220, antenna 111 and a third set of subcarriers are used, during the second slot of the subframe, to transmit the third block of transformed data symbols. In step 221, antenna 111 is used, during the second slot of the subframe, to transmit the first reference sequence. In step 222, antenna 112 and a fourth set of subcarriers are used, during the second slot of the subframe, to transmit the fourth block of transformed data symbols. In step 223, antenna 112 is used, during the second slot of the subframe, to transmit the second reference sequence.

Figure 3B:
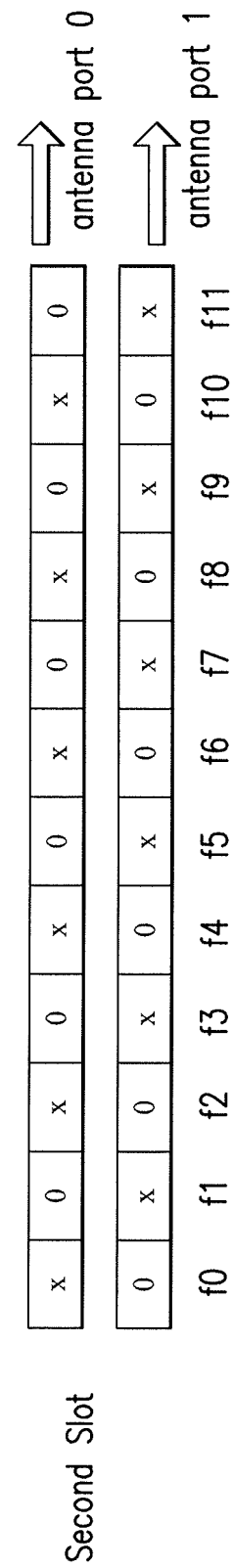

Advantageously, the third set of subcarriers is orthogonal with the fourth set of subcarriers. This is illustrated in FIG. 3B. As show in FIG. 3B, the even indexed subcarriers (i.e., f0, f2, . . . , f10) are used to transmit the third block of transformed data symbols, but the odd indexed subcarrier are set to zero, and the odd indexed subcarriers (i.e., f1, f3, . . . , f11) are used to transmit the fourth block of transformed data symbols, but the even indexed subcarrier are set to zero. This provides the feature of frequency-domain separation for the payload signals (i.e., the third and fourth blocks of transformed data symbols) and time-domain orthogonal spreading separation and/or sequence phase shift separation. In steps 221 and 223, the reference sequences may be transmitted using all of the twelve available subcarriers. In this case, the first reference sequence should be orthogonal with the second reference sequence.

Figures 4A, 4B:
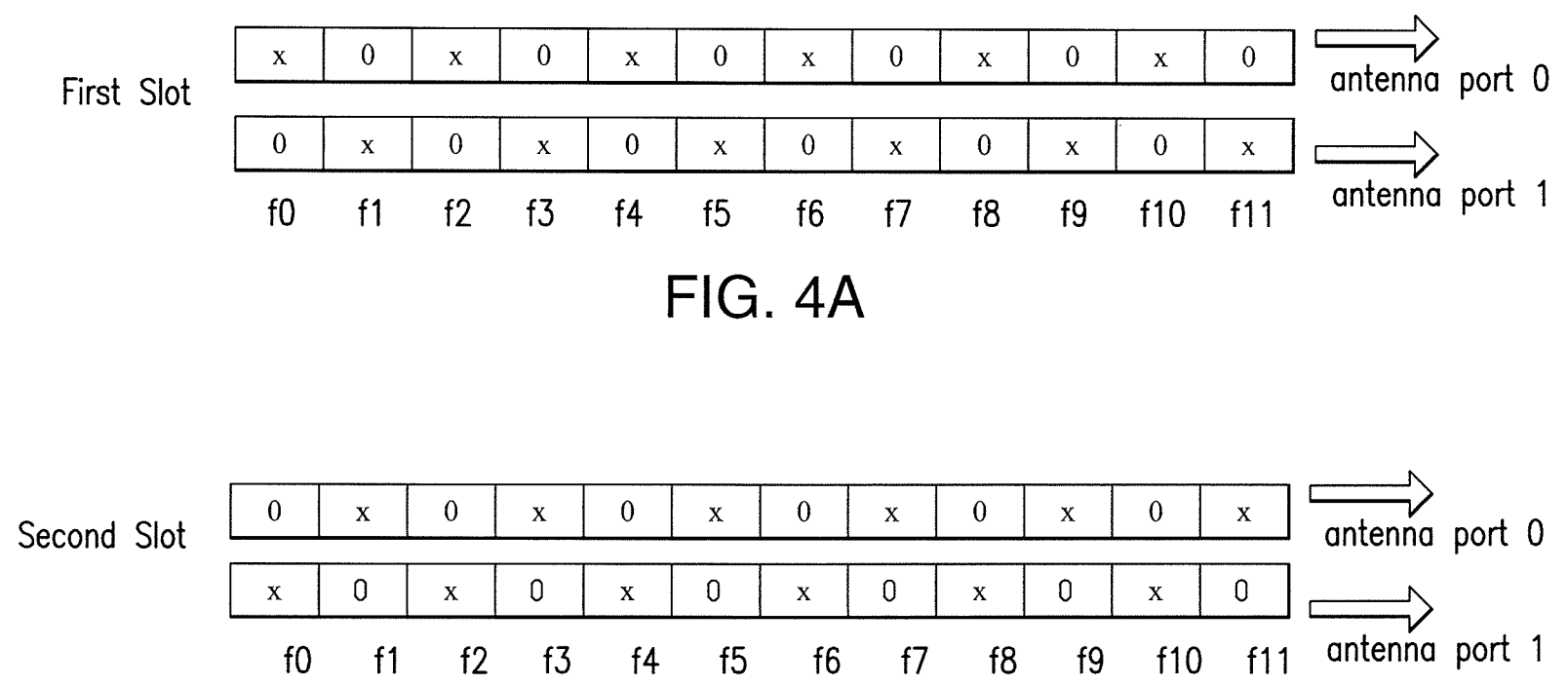

In another embodiment, to provide even more uniform spatial diversity exposure to all the signals, cyclic frequency offset can be introduced for different symbols as illustrated in FIGS. 4A,B. As shown in these figures, only even indexed subcarriers (i.e., f0, f2, . . . , f10) are used to transmit the first and fourth blocks of transformed data symbols, which data is transmitted via antenna ports 0 and 1, respectively, and only the odd indexed subcarriers (i.e., f1, f3, . . . , f11) are used to transmit the second and third blocks of transformed data symbols, which data is transmitted via antenna ports 0 and 1, respectively.

The above described transmit diversity scheme for the DFTS-OFDM PUCCH provides substantial link performance gains. The required operating SNR for these different schemes are determined based on the following performance requirements:

$$Freq(PUCCH\ DTX \to ACK\ bits) = \frac{\#(false\ ACK\ bits)}{\#(PUCCH\ DTX)} \leq 10^{-2}$$

$$Pr(NAK\ or\ DTX\ bits \to ACK\ bits) \leq 10^{-3}$$

$$Pr(ACK\ bits \to NAK\ bits\ or\ DTX) \leq 10^{-2}$$

Figure 5:
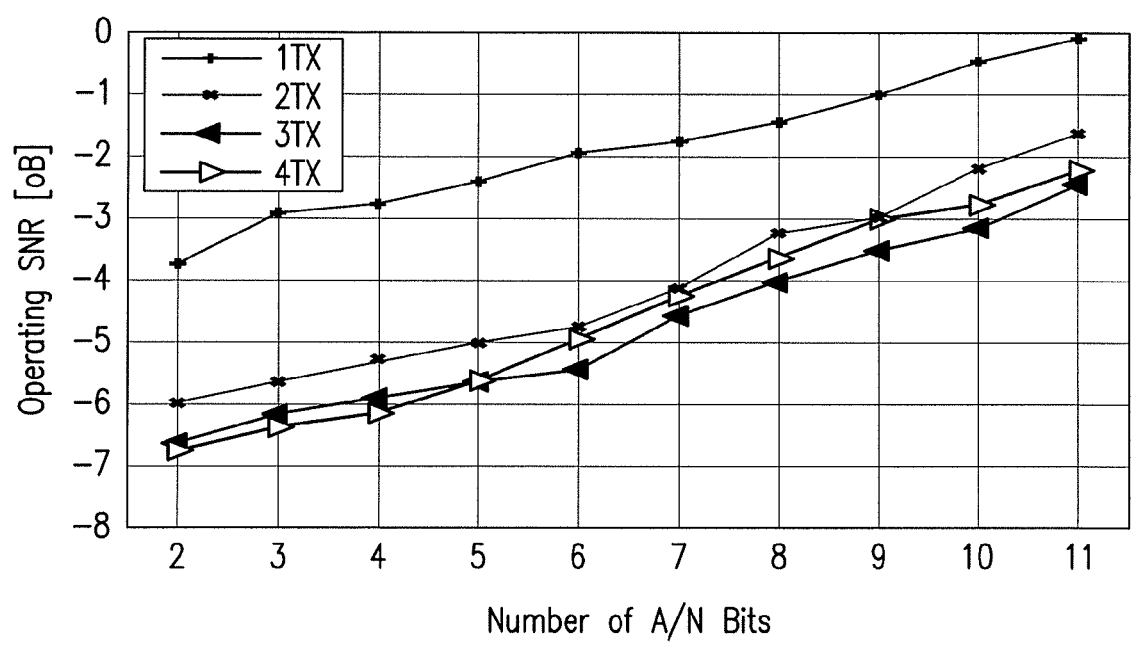
FIG. 5 illustrates data summarizing the performance of a transmit diversity method according to particular embodiments.

The link simulations are set such that Freq(PUCCH DTX→ACK bits)=$10^{-2}$. The operating SNRs is taken as the larger of those required for achieving Pr(ACK bits→NAK bits or DTX)=$10^{-2}$ and Pr(NAK or DTX bits→ACK bits)=$10^{-3}$. The performance of the transmit diversity scheme is summarized in FIG. 5. It can be observed that, with two antenna ports, link performance gains of around 2-2.5 dB can be obtained. Transmit diversity with three or four antenna ports can offer further link performance gains.

Figure 6:
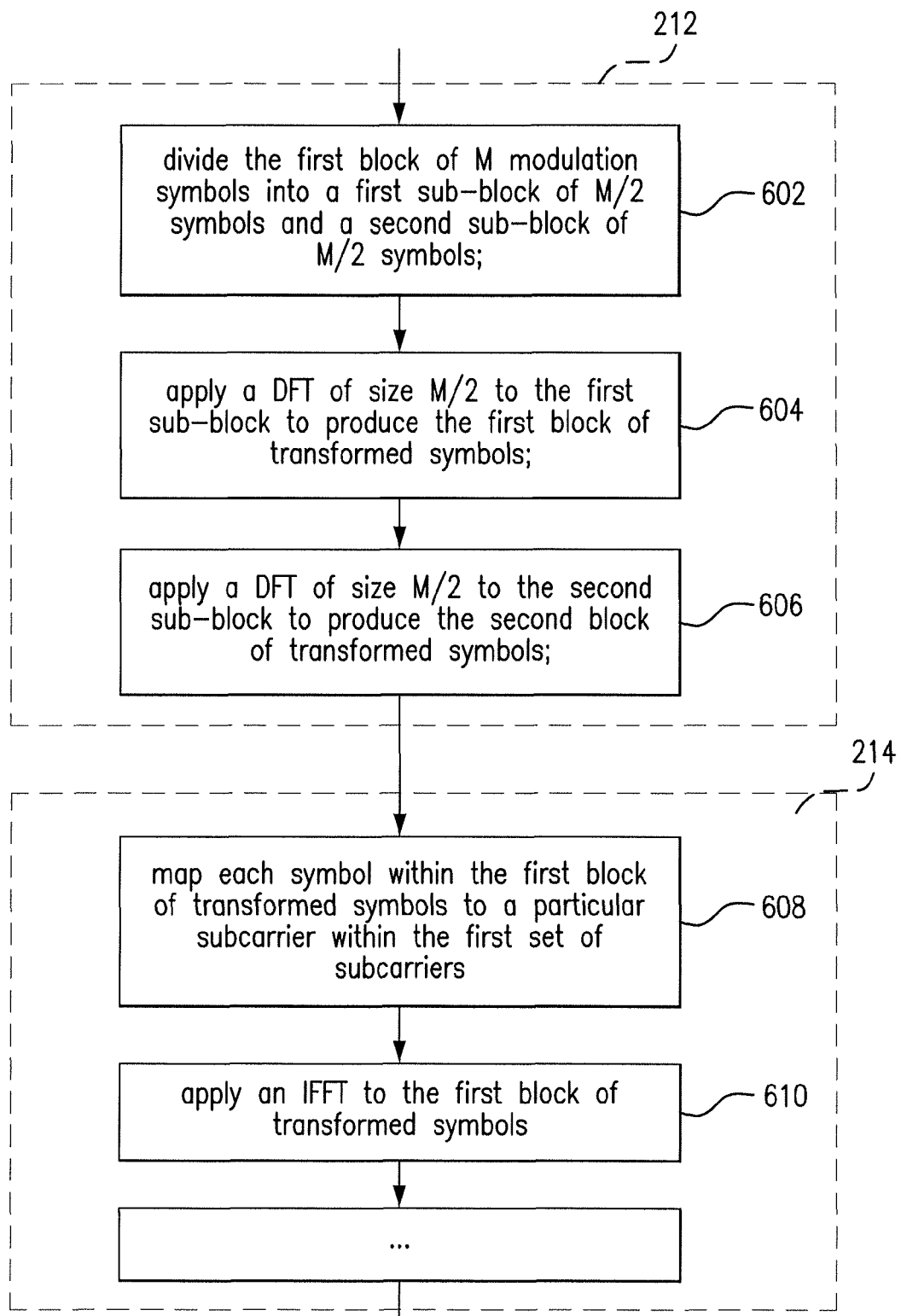
FIG. 6 is a flow chart illustrating example processes for implementing certain steps shown in FIG. 2.

Referring now to FIG. 6, FIG. 6 illustrates (a) exemplary steps 602-606 that may be performed in implementing step 212 of process 200 and (b) exemplary steps 608-610 that may be performed in implementing step 214 of process 200. In step 602, the first block of M data symbols is divided into two equal sized sub-blocks: a first sub-block of M/2 data symbols and a second sub-block M/2 data symbols. In step 604, a DFT of size M/2 is applied to the first sub-block of data symbols to produce the first block of transformed data symbols. Similarly, in step 606, a DFT of size M/2 is applied to the second sub-block of data symbols to produce the second block of transformed data symbols. In step 608, each data symbol within the first block of transformed data symbols is mapped to a particular subcarrier within the first set of subcarriers. In step 610, an inverse fast Fourier transform (IFFT) is applied to the first block of transformed data symbols.

Figure 7:
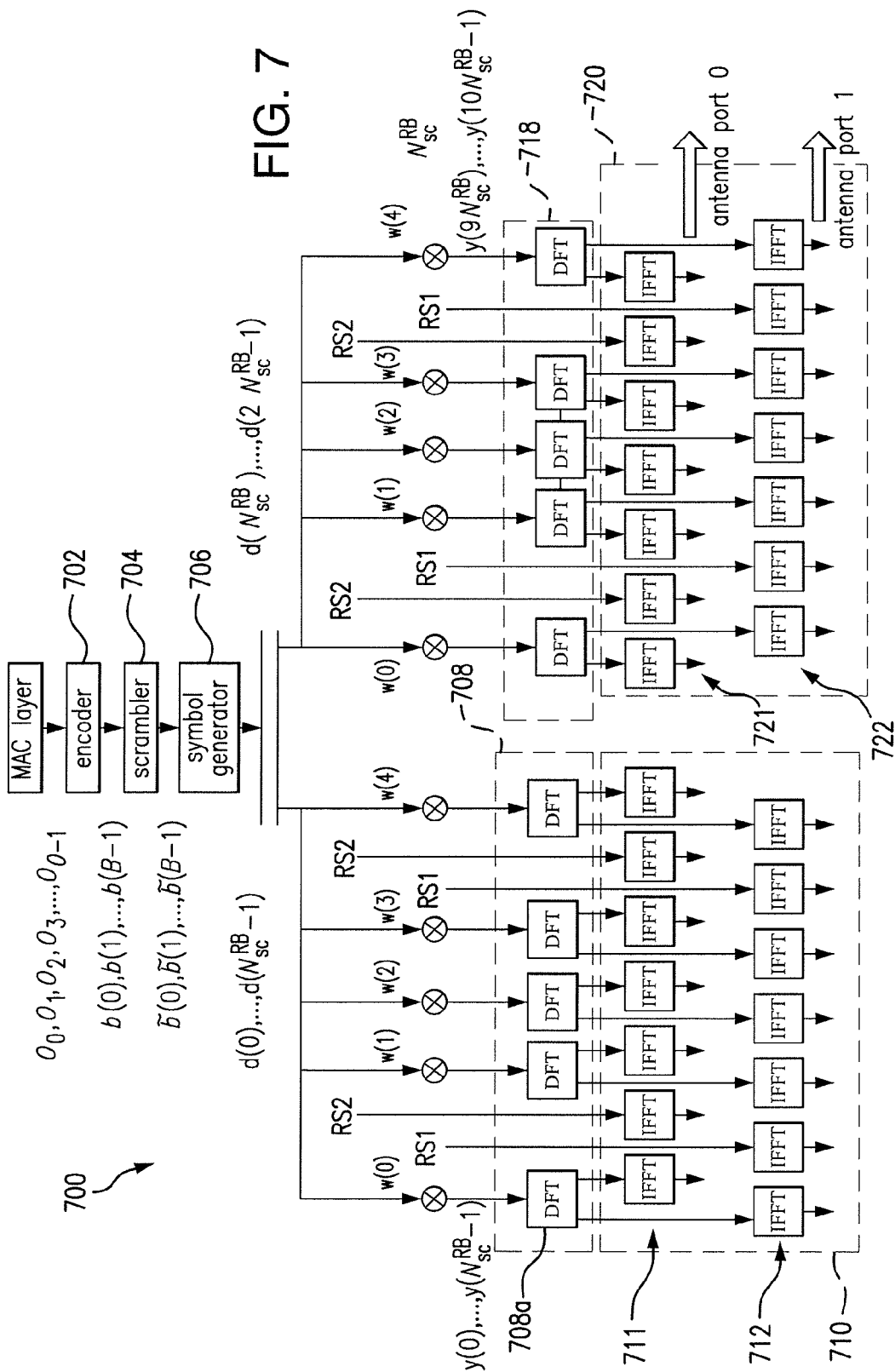
FIG. 7 is a block diagram of a particular embodiment of an apparatus for transmit diversity coding of DFTS-OFDM PUCCH.

Referring now to FIG. 7, FIG. 7 illustrates a transmit diversity coding apparatus 700 for DFTS-OFDM PUCCH, according to an embodiment.

As shown in FIG. 7, apparatus 700 may receive message bits (denoted $o_0, o_1, o_2, o_3, \ldots, o_{o-1}$) from a media-access control (MAC) layer (e.g., HARQ ACK/NACK bits) and employ an encoder 702 for coding the message bits into a block of bits b(0),b(1), . . . , b(B−1) according to Section 5.2.2.6.4 of 3GPP TS 36.212, where B=$4N_{sc}^{RB}$ (e.g., the bits may be coded to form a block of 48 coded bits).

In one embodiment, these message bits may consist of HARQ ACK/NACK bits. In another embodiment, the message bits may consist of HARQ ACK/NACK bits (e.g., bit $o_0$, $o_1, o_2, o_3, \ldots, o_{o-2}$) and a scheduling request bit (e.g., bit $o_{o-1}$). The scheduling request bit shall be set to 1 to request scheduling and 0 otherwise. In yet another embodiment the bits corresponding to HARQ feedback may have been obtained by a logical AND operation of several individual HARQ feedback bits. This embodiment corresponds to partial bundling where multiple HARQ feedback bits are logical AND combined and only one bit is transmitted per bundle.

Apparatus 700 includes a scrambler 704 for scrambling the block of coded bits b(0),b(1), . . . , b(B−1). The scrambler may use a cell-specific (and possible DFTS-OFDM symbol dependent) sequence to produce a block of B scrambled bits $\tilde{b}(0),\tilde{b}(1), \ldots, \tilde{b}(B-1)$, according to $\tilde{b}(i)=(b(i)+c(i))\bmod 2$, where i=0, 1, . . . , B−1 and the scrambling sequence c(i) is given by section 7.2 of 3GPP TS 36.211. The scrambling sequence generator can for example be initialized with $c_{init}=\lfloor n_s/2 \rfloor \cdot 2^9 + N_{ID}^{cell}$ at the start of each subframe.

In one embodiment illustrated in FIG. 7, the output from encoder 702 may be divided into two sub-blocks: a first sub-block $\tilde{b}(0),\tilde{b}(1), \ldots, \tilde{b}(B/2-1)$ and a second sub-block $\tilde{b}(B/2), \tilde{b}(B/2+1), \ldots, \tilde{b}(B-1)$. The first sub-block is repeated $N_{SF,0}^{PUCCH}$ times and the second sub-block is repeated $N_{SF,1}^{PUCCH}$ times. The repeated coded bit sequence is then scrambled by the scrambling code sequence with initialization method disclosed above.

Apparatus 700 also includes a symbol generator 706 that receives the coded and scrambled bits, uses a first set of those bits (e.g., 24 of the 48 bits) to produce a first block of N data symbols 791 (e.g., 12 data symbols) and uses the other bits (e.g., the other 24 of the 48 bits) to produce a second block of N data symbols 792. For example, symbol generator 706 may be a modulator that QPSK modulates the bits to produce a block of complex-valued data symbols: d(0), . . . , $d(2N_{sc}^{RB}-1)$, which may be divided into two blocks of complex-valued modulation symbols: a first block d(0), . . . , $d(NR_{sc}^{RB}-1)$ and a second block $d(N_{sc}^{RB}), \ldots, d(2NR_{sc}-1)$.

As shown in FIG. 7, for each of the first and second blocks of data symbols, the block of data symbols is spread with an orthogonal sequence $w_{n_{oc}}(i)$, thereby producing, in total, a block of complex-valued data symbols y(0), . . . , $y(M_{symb}-1)$ according to:

$$y(l \cdot N_{sc}^{RB}+i)=w_{n_{oc}}(l \bmod N_{SF,0}^{PUCCH}) \cdot d(\lfloor l/N_{SF,0}^{PUCCH} \rfloor \cdot N_{sc}^{RB}+i)$$

$$i=0, \ldots, N_{sc}^{RB}-1$$

$$l=0, \ldots, M_{symb}/N_{sc}^{RB}-1$$

where $$M_{symb}=(N_{SF,0}^{PUCCH}+N_{SF,1}^{PUCCH}) \cdot N_{sc}^{RB}.$$

For normal DFT-S-OFDM PUCCH $N_{SF,0}^{PUCCH}=5$ and $N_{SF,1}^{PUCCH}=5$. For shortened DFT-S-OFDM PUCCH $N_{SF,0}^{PUCCH}=5$ and $N_{SF,1}^{PUCCH}=4$.

The sequence $w_{n_{oc}}(i)$ is given in tables I and II below.

TABLE I

Orthogonal sequences [w(0) . . . $w(N_{SF}^{PUCCH}-1)]$ for $N_{SF}^{PUCCH}=5$.

| Sequence index $n_{oc}(n_s)$ | Orthogonal sequences [w(0) . . . $w(N_{SF}^{PUCCH}-1)]$ |
|---|---|
| 0 | [1 1 1 1 1] |
| 1 | [1 $e^{j2\pi/5}$ $e^{j4\pi/5}$ $e^{j6\pi/5}$ $e^{j8\pi/5}$] |
| 2 | [1 $e^{j4\pi/5}$ $e^{j8\pi/5}$ $e^{j2\pi/5}$ $e^{j6\pi/5}$] |
| 3 | [1 $e^{j6\pi/5}$ $e^{j2\pi/5}$ $e^{j8\pi/5}$ $e^{j4\pi/5}$] |
| 4 | [1 $e^{j8\pi/5}$ $e^{j6\pi/5}$ $e^{j4\pi/5}$ $e^{j2\pi/5}$] |

TABLE II

Orthogonal sequences [w(0) . . . $w(N_{SF}^{PUCCH}-1)]$ for $N_{SF}^{PUCCH}=4$.

| Sequence index $n_{oc}(n_s)$ | Orthogonal sequences [w(0) . . . $w(N_{SF}^{PUCCH}-1)]$ |
|---|---|
| 0 | [+1 +1 +1 +1] |
| 1 | [+1 −1 +1 −1] |
| 2 | [+1 −1 −1 +1] |
| 3 | [+1 +1 −1 −1] |

The block of complex-valued data symbols y(0), . . . $y(M_{symb}-1)$ is divided into $M_{symb}/M_{sc}^{PUCCH}$ blocks where $M_{sc}^{PUCCH}=N_{sc}^{RB}$. In the example shown, the number of blocks is equal to 10 and each block corresponds to one SC-FDMA symbol. For example, the first block consists of y(0), ..., y($N_{sc}^{RB}$−1), the second block consists of y($N_{sc}^{RB}$), ..., y($2N_{sc}^{RB}$−1), and the tenth block consists of y($9N_{sc}^{RB}$), ..., y($10N_{sc}^{RB}$−1).

In the embodiment shown, five of the ten blocks of data symbols are processed by a set of DFTs 708 and a set IFFTs 710, which set of IFFTs consists of a first subset of IFFTs 711 and a second subset of IFFTs 712. The other five blocks of data symbols are processed by a set of DFTs 718 and a set of IFFTs 720, which set of IFFTs consists of a first subset of IFFTs 721 and a second subset of IFFTs 722. The data processed by DFTs 708 and IFFTs 710 is transmitted in the first slot of a subframe and the data processed DFTs 718 and IFFTs 720 is transmitted in the second slot of the subframe.

Each DFT in sets 708 and 718 transform precodes one of the above described sets of data symbols. For example, DFT 708a will transform precode the block of data symbols y(0), ..., y($N_{sc}^{RB}$−1). In some embodiment, the transform precoding applied by the DFTs is applied according to:

$$z^{(p)}(l \cdot M_{sc}^{PUCCH} + k \cdot P + p') = \begin{cases} \frac{1}{\sqrt{M_{sc}^{PUCCH}/P}} \sum_{i=0}^{M_{sc}^{PUCCH}/P-1} y(l \cdot M_{sc}^{PUCCH} + i \cdot P + p) \cdot e^{j\frac{2\pi i k}{M_{sc}^{PUCCH}/P}}, & \text{if } p' = p \\ 0, & \text{if } p' \neq p \end{cases}$$

$p = 0, \ldots, P-1$ $p' = 0, \ldots, P-1$ $k = 0, \ldots, M_{sc}^{PUCCH}/P - 1$ $l = 0, \ldots, M_{symb}/M_{sc}^{PUCCH} - 1$ resulting in P blocks of complex-value symbols $z^{(p)}(0)$, ..., $z^{(p)}(M_{symb}-1)$, where p=0, ..., P−1 and P is equal to the number of transmit antennas (in the embodiment shown P=2, but P may be greater than 2). The p-th block of complex-value symbols $z^{(p)}(0)$, ..., $z^{(p)}(M_{symb}-1)$ is transmitted on antenna port p. In our example, antenna port 0 corresponds to antenna 111 and antenna port 1 corresponds to antenna 112. It can be seen from the above computation that the p-th block may have nonzero values at in indices [p, p+P, p+2P, ... ] and zeros at all other indices. This is illustrated for the case of P=2 in FIGS. 3A and 3B.

As an example, DFT 708a will produce two blocks of transformed data symbols: a first block of transformed symbols) $z^{(0)}(0)$, ..., $z^{(0)}(N_{sc}^{RB}-1)$ and a second block of transformed symbols $z^{(1)}(0)$, ..., $z^{(1)}(N_{sc}^{RB}-1)$. As described above, the first block of transformed symbols) $z^{(0)}(0)$, ..., $z^{(0)}(N_{sc}^{RB}-1)$ has nonzero values at in indices [0, 2, 4, ... ] and zeros at all other indices, whereas the second block of transformed symbols $z^{(1)}(0)$, ..., $z^{(1)}(N_{sc}^{RB}-1)$ has nonzero values at in indices [1, 3, 5, ... ] and zeros at all other indices.

Figure 8:
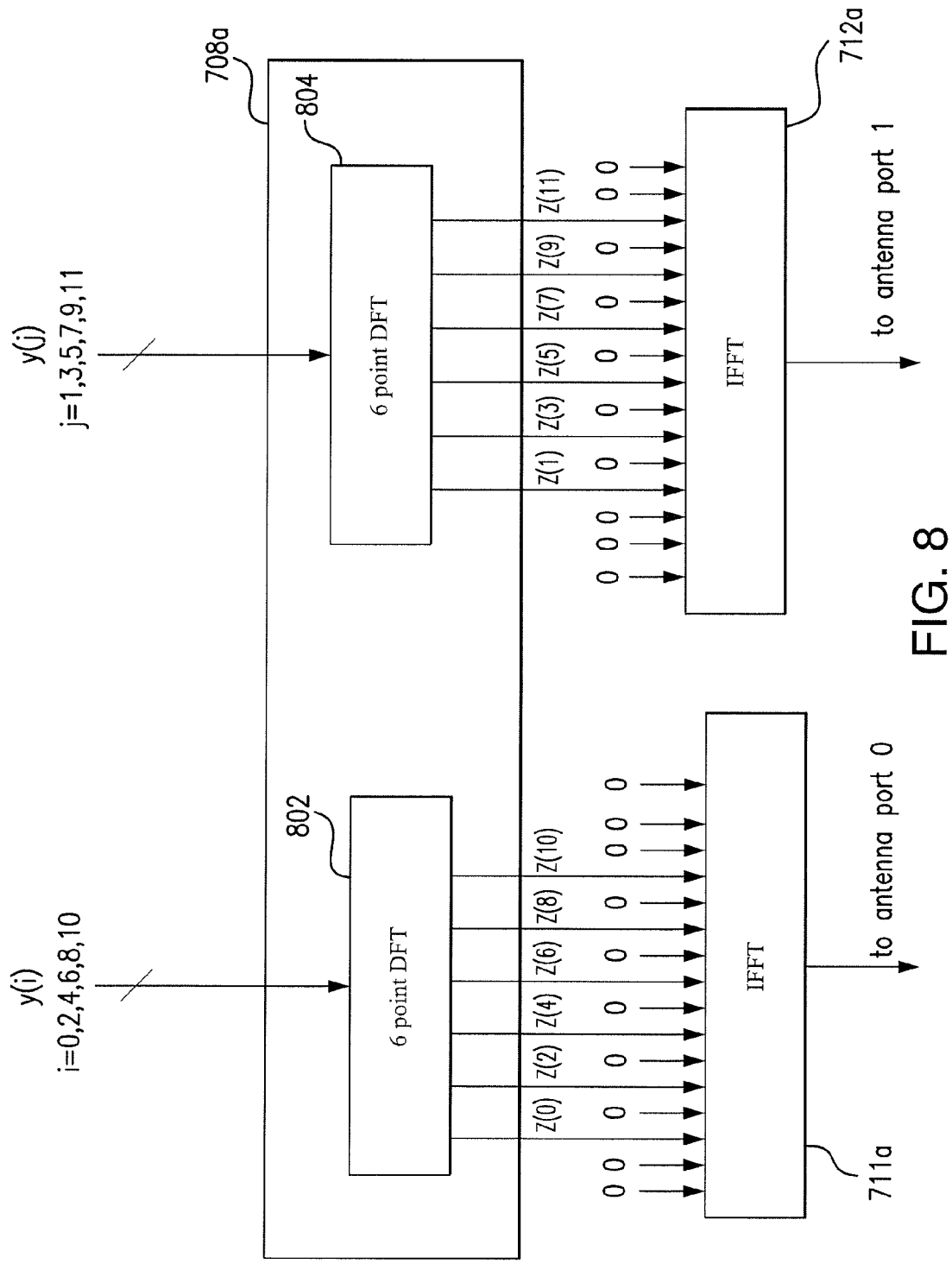
FIG. 8 is a block diagram of a DFT module that may be utilized in particular embodiments of the apparatus shown in FIG. 7.

Referring now to FIG. 8, FIG. 8 illustrates an example implementation of DFT 708a. As shown, DFT 708a includes two 6 point DFTs: DFT 802 and DFT 804. As further shown, the input to DFT 802 is y(0), y(2), y(4), y(6), y(8), y(10). DFT 802 transforms this input in the conventional manner to produce a first block of six transformed symbols z(0), z(2), z(4), z(6), z(8), z(10). This first block of six transformed symbols, together with six 0s for padding, are provided to twelve consecutive inputs of an IFFT 711a, as shown. Likewise the input to DFT 804 is y(1), y(3), y(5), y(7), y(9), y(11). DFT 804 transforms this input in the conventional manner to produce a second block of six transformed symbols z(1), z(3), z(5), z(7), z(9), z(11). This second block of six transformed symbols together with six 0s for padding are provided to twelve consecutive inputs of an IFFT 712a as shown.

The output of IFFT 711a is coupled, via conventional transmission components, to antenna port 0 and the output of IFFT 712a is coupled, via conventional transmission components, to antenna port 1 so that the first and second blocks of transformed symbols are transmitted via antennas 111 and 112, respectively, during the first slot of the subframe. As described above a first set of subcarriers will be used to transmit the first block of transformed symbols and a second set of subcarriers will be used to transmit the second block of transformed symbols, where the first set of subcarriers is orthogonal with the second set of subcarriers (see e.g., FIG. 3A).

In another embodiment, to enable per-SC-FDMA-symbol cyclic frequency offset, the transform precoding procedure described above may be modified such that the transform precoding applied by the DFTs is applied according to:

$$z^{(p)}(l \cdot M_{sc}^{PUCCH} + (k \cdot P + p' + l \bmod M_{sc}^{PUCCH})) = \begin{cases} \frac{1}{\sqrt{M_{sc}^{PUCCH}/P}} \sum_{i=0}^{M_{sc}^{PUCCH}/P-1} y(l \cdot M_{sc}^{PUCCH} + i \cdot P + p) \cdot e^{-j\frac{2\pi i k}{M_{sc}^{PUCCH}/P}}, & \text{if } p' = p \\ 0, & \text{if } p' \neq p \end{cases}$$

where $p = 0, \ldots, P-1$ $p' = 0, \ldots, P-1$ $k = 0, \ldots, M_{sc}^{PUCCH}/P - 1$ $l = 0, \ldots, M_{symb}/M_{sc}^{PUCCH} - 1$ As with the other described transform precoding procedure, this procedure results in P blocks of complex-valued symbols $z^{(p)}(0)$, ..., $z^{(p)}(M_{symb}-1)$, where p=0, ..., P−1. The p-th block of complex-valued symbols $z^{(p)}(0)$, ..., $z^{(p)}(M_{symb}-1)$ is to be transmitted on antenna port p. An illustration of the per-SC-FDMA-symbol cyclic frequency offset for the case of P=2 is given in FIGS. 4A,B. The cyclic frequency offset step $\Delta_f$ can also be larger than 1. In general, the extended transform precoding is given by $$z^{(p)}(l \cdot M_{sc}^{PUCCH} + (k \cdot P + p' + l \cdot \Delta_f \bmod M_{sc}^{PUCCH})) = \begin{cases} \frac{1}{\sqrt{M_{sc}^{PUCCH}/P}} \sum_{i=0}^{M_{sc}^{PUCCH}/P-1} y(l \cdot M_{sc}^{PUCCH} + i \cdot P + p) \cdot e^{-j\frac{2\pi i k}{M_{sc}^{PUCCH}/P}}, & \text{if } p' = p \\ 0, & \text{if } p' \neq p \end{cases}$$

A slightly different mapping is $$z^{(p)}(l \cdot M_{sc}^{PUCCH} + (k \cdot P + (p' + l \bmod P) \cdot \Delta_f \bmod M_{sc}^{PUCCH})) =$$

$$\begin{cases} \dfrac{1}{\sqrt{M_{sc}^{PUCCH}/P}} \sum_{i=0}^{M_{sc}^{PUCCH}/P-1} & \text{if } p' = p \\ y(l \cdot M_{sc}^{PUCCH} + i \cdot P + p) \cdot e^{-j\frac{2\pi ik}{M_{sc}^{PUCCH}/P}}, \\ 0, & \text{if } p' \neq p \end{cases}$$

which leads to the same subcarrier mapping every P-th SC-FDMA symbol.

Demodulation Reference Signal

As shown in FIG. 7, because there are P transmit antennas, P different reference sequences may be used to generate the demodulation reference signals. In the example shown, P=2, thus two reference sequences are used: a first reference sequence (RS1) and a second reference sequence (RS2). RS1 is transmitted using antenna port 0 and RS2 is transmitted using antenna port 1. Each RS may be transmitted once or twice during a slot, depending on whether normal or extended cyclic prefix (CP) subframes are being used. In the example shown, normal CP subframes are being used. The same demodulation reference signal generation for Format 2 PUCCH is applied except the orthogonal sequences are given in table III, below:

TABLE III

| Sequence index $\bar{n}_{oc}(n_s)$ | Orthogonal sequences [$\bar{w}(0)$ ... $\bar{w}(N_{RS}^{PUCCH}-1)$] for DFT-S-OFDM PUCCH. | |
| --- | --- | --- |
| | Normal cyclic prefix | Extended cyclic prefix |
| 0 | [+1 +1] | [1] |
| 1 | [+1 −1] | N/A |

With $N_{RS}^{PUCCH}=2$ and the standard setting of $\Delta_{shift}^{PUCCH}=2$ in normal CP subframes, there are 12 reference sequences available. The numbers of UEs that can be multiplexed on the same resource block are 5, 5, 4 and 3 for P=1, 2, 3 and 4, respectively. With $N_{RS}^{PUCCH}=1$ and the standard setting of $\Delta_{shift}^{PUCCH}=2$ in extended CP subframes, there are 6 reference sequences available. The numbers of UEs that can be multiplexed on the same RB are 5, 3, 2 and 1 for P=1, 2, 3 and 4, respectively.

RS1 and RS2 may be of length $N_{SC}^{RB}/P$. Suitable sequences are CASAC sequences of length $N_{SC}^{RB}/P$ or computer-optimized sequences. From one base sequence additional orthogonal sequences can be derived by cyclic shifting the base sequence as described in 3GPP TS 36.211, "Physical Channel and Modulation." For normal CP with $N_{RS}^{PUCCH}=2$ RS per slot time-domain block spreading can be applied to increase the number of available RS sequences or alternatively to increase the cyclic shift distance between RS sequences RS1 and RS2 may be transmitted on the same set of subcarriers. In such embodiments, RS1 and RS2 may be orthogonal. For example, RS1 may be a cyclic shift of the second reference sequence.

In other embodiments, the reference sequences may be mapped in a distributed fashion, like the data payload as discussed above. That is, the RS of the different antenna ports are mapped to different frequency-domain combs. For example, for P=2 antennas: RS for antenna port 0 (e.g., RS1) occupies the even-indexed sub-carriers in even-indexed SC-FDMA symbols and in odd-indexed sub-carriers in odd-indexed SC-FDMA symbols (or vice versa); and RS signal for antenna port 1 (e.g., RS2) occupies the odd-indexed sub-carriers in even-indexed SC-FDMA symbols and in even-indexed sub-carriers in odd-indexed SC-FDMA symbols (or vice versa).

Figure 9:
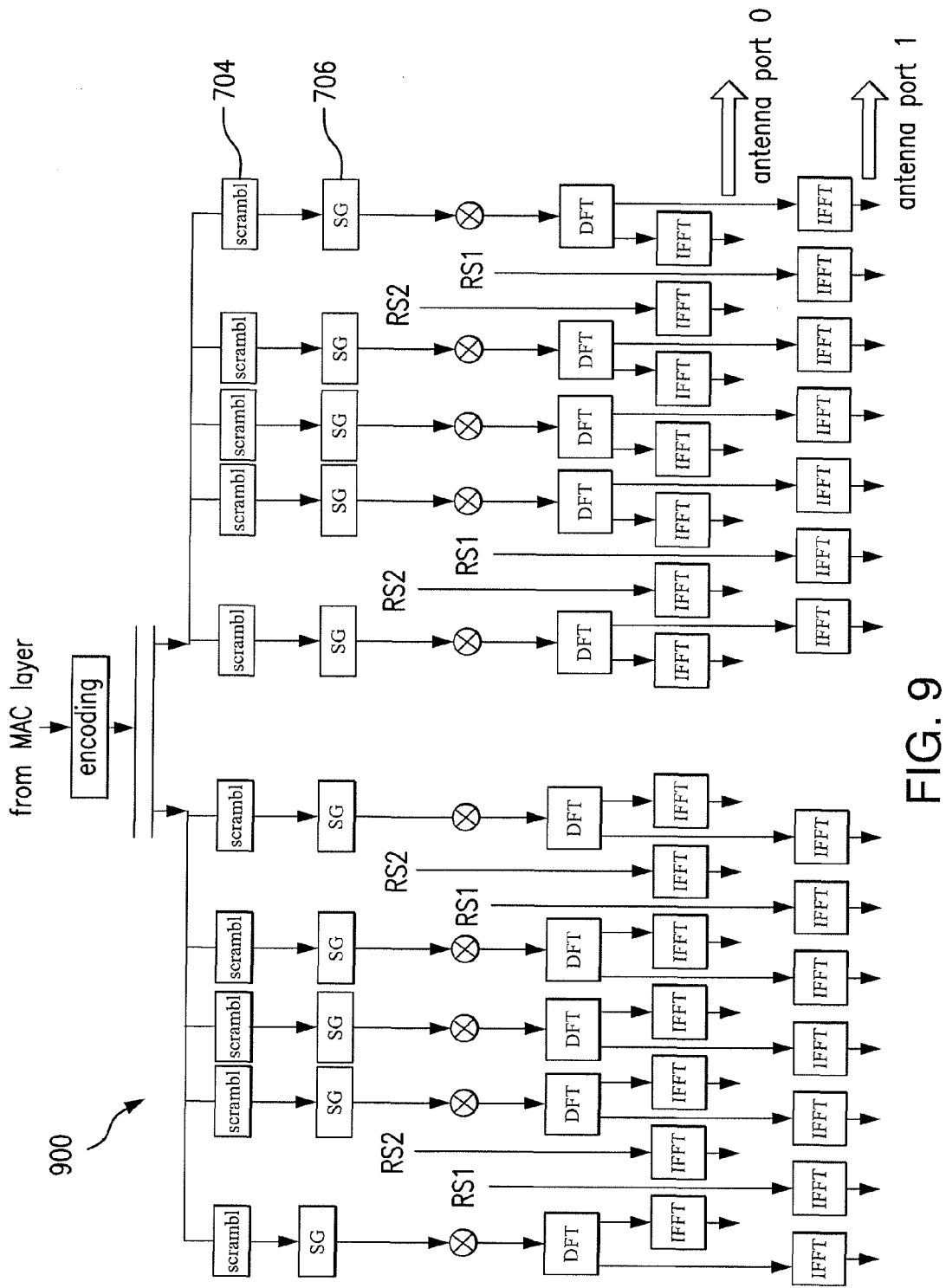
FIG. 9 is a block diagram of an alternative embodiment of the apparatus shown in FIG. 7.

Referring now to FIG. 9, FIG. 9 illustrates an alternative embodiment of the transmit diversity coding apparatus shown in FIG. 7. This alternative embodiment, apparatus 900, is nearly identical with apparatus 700, with the exception that, in apparatus 700 there is a single scrambler and symbol generator, whereas, in apparatus 900, a scrambler 704 and a symbol generator (SG) 706 are placed in each branch corresponding to an SC-FDMA symbol.

In apparatus 900, the scrambling code can be made SC-FDMA symbol dependent by initializing each scrambler shown in FIG. 9 at the beginning of each slot with a seed that depends on the slot or subframe number.

Other ways to make the scrambling code SC-FDMA symbol dependent are possible. For example, for the first slot the bits $\tilde{b}(0), \tilde{b}(1), \ldots, \tilde{b}(B/2-1)$ and for the second slot the bits $\tilde{b}(B/2), \tilde{b}(B/2+1), \ldots, \tilde{b}(B-1)$ are repeated $N_{SF,0}^{PUCCH}$ and $N_{SF,1}^{PUCCH}$ times, respectively. The bits in the first and second slot are then scrambled by a $B/2 \cdot N_{SF,0}^{PUCCH}$ and $B/2 \cdot N_{SF,1}^{PUCCH}$ element long sequence, respectively. The scrambling sequence generator is initialized at the beginning of each slot with a seed that depends on the slot or subframe number. The scrambled bits are then mapped to QPSK symbols and in each SC-FDMA $N_{SC}^{RB}$ QPSK symbols are transmitted.

Alternatively, the bit block $\tilde{b}(0), \tilde{b}(1), \ldots, \tilde{b}(B/2-1)$ is repeated $N_{SF,0}^{PUCCH}$ times and concatenated with the bit block $\tilde{b}(B/2), \tilde{b}(B/2+1), \ldots, \tilde{b}(B-1)$ which is repeated $N_{SF,1}^{PUCCH}$ times to form a $B/2 \cdot (N_{SF,0}^{PUCCH} + N_{SF,1}^{PUCCH})$ element long bit block. This bit element long bit block. This bit sequence is then scrambled. The scrambling sequence generator is initialized at the beginning of each subframe with a seed that depends on the subframe number. The scrambled bits are then mapped to QPSK symbols and in each SC-FDMA $N_{SC}^{RB}$ QPSK symbols are transmitted.

Figure 10:
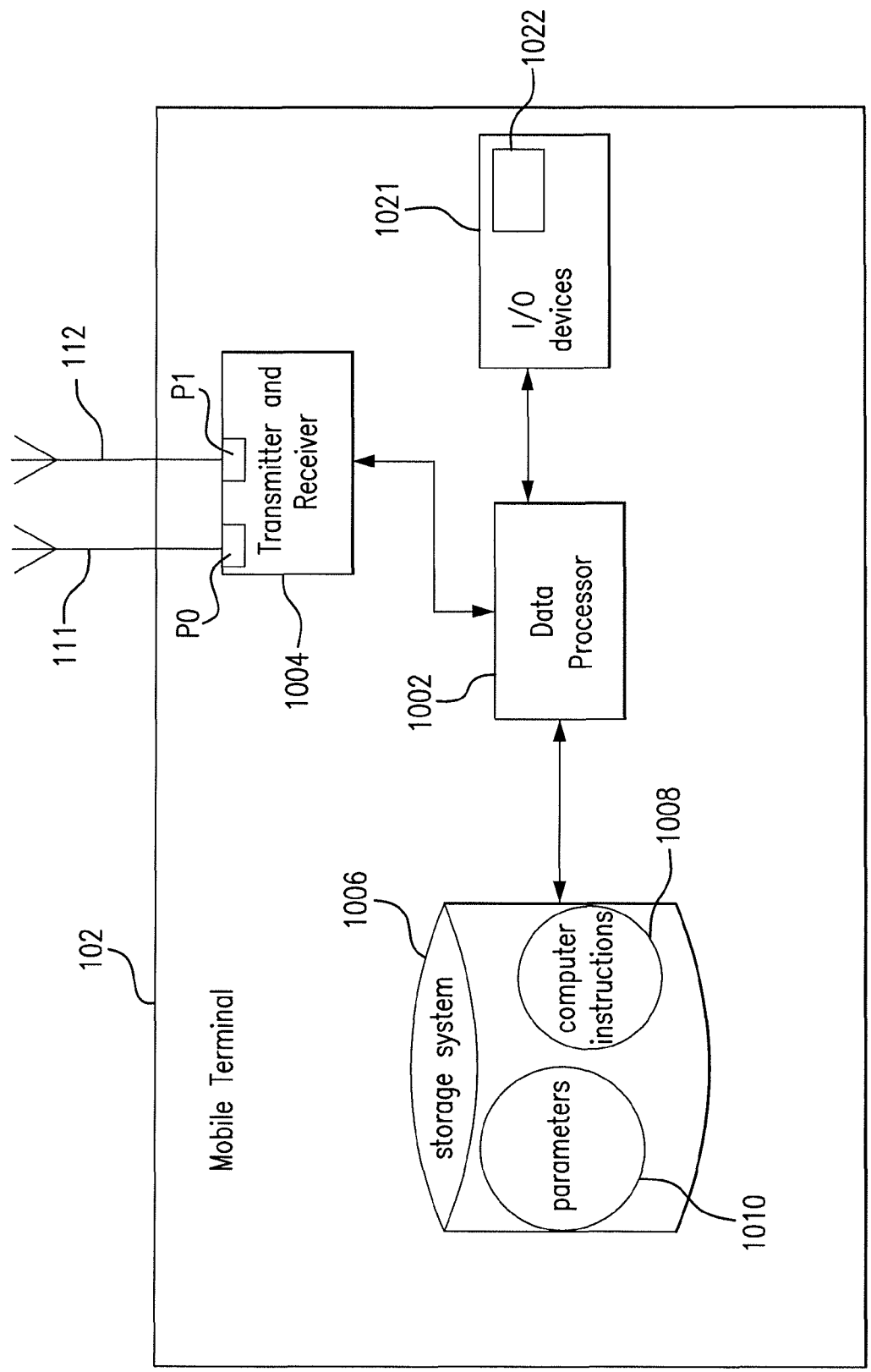
FIG. 10 is a block diagram of a mobile terminal.

Referring now to FIG. 10, FIG. 10 illustrates a block diagram of an example mobile terminal 102 in which transmit diversity coding apparatus 700 and/or transmit diversity coding apparatus 900 may be implemented. As shown in FIG. 10, terminal 102 may include: a data processor 1002, which may include one or more microprocessors and/or one or more circuits, such as an application specific integrated circuit (ASIC), Field-programmable gate arrays (FPGAs), etc; a transmitter and a receiver 1004 coupled to antennas 111 and 112 via antenna port 0 (p0) and antenna port 1 (p1), respectively, for wireless communications; input/out devices 1021 (e.g., a display screen 1022); a storage system 1006, which may include one or more non-volatile storage devices and/or one or more volatile storage devices (e.g., random access memory (RAM)). In embodiments where data processor 1002 includes a microprocessor, computer instructions 1008 (i.e., computer readable code means) may be stored in storage system 1006. Configuration parameters 1010 may also be stored. The computer instructions 1008 may be embodied in a computer program stored using a computer readable means, such as, but not limited to magnetic media (e.g., a hard disk), optical media (e.g., a DVD), memory devices (e.g., random access memory), etc. In some embodiments, computer instructions 1008 are configured such that when computer instructions 1008 are executed, computer instructions 1008 cause mobile terminal 102 to perform steps described above (e.g., steps describe above with reference to the flow charts shown in FIGS. 2 and 6). In other embodiments, mobile terminal 102 is configured to perform steps described above without the need for computer instructions 1008. That is, for example, data processor 1002 may consist merely of one or more ASICs. Hence, the features of the present invention described above may be implemented in hardware and/or software. For example, in particular embodiments, the functional components of apparatus 700 and/or apparatus 900 described above may be implemented in terminal 102 by processor 1002 executing computer instructions 1008, by processor 1002 operating independent of any computer instructions 1008, or by any suitable combination of hardware and/or software.

While various embodiments of the present invention have been described above, it should be understood that they have been presented by way of example only, and not limitation. Thus, the breadth and scope of the present invention should not be limited by any of the above-described exemplary embodiments. Moreover, any combination of the above-described elements in all possible variations thereof is encompassed by the invention unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. In a mobile terminal having a first antenna and a second antenna, a transmit diversity method for discrete Fourier transform (DFT) precoded channels, the method comprising:
   producing a block of data symbols;
   transforming said block of data symbols to produce a first block of transformed symbols and a second block of transformed symbols;
   using the first antenna, transmitting the first block of transformed symbols and a first reference sequence, wherein the transmitting step occurs during a slot of a subframe of a radio frame; and
   using the second antenna, transmitting, during said slot, the second block of transformed symbols and a second reference sequence, wherein
   the first block of transformed symbols is transmitted using only a first set of subcarriers,
   the second block of transformed symbols is transmitted using only a second set of subcarriers that is orthogonal to the first set of subcarriers, and
   the first reference sequence and the second reference sequence are transmitted using a third set of subcarriers that comprises that first set of subcarriers and the second set of subcarriers.

2. The method of claim 1, wherein the first reference sequence is orthogonal to the second reference sequence.

3. The method of claim 2, wherein the first reference sequence is a cyclic shift of the second reference sequence.

4. The method of claim 1, wherein the step of transforming said block of data symbols comprises:
   dividing the block of data symbols into at least a first sub-block and a second sub-block;
   applying a discrete Fourier transform (DFT) to the first sub-block to produce the first block of transformed symbols; and
   applying a discrete Fourier transform (DFT) to the second sub-block to produce the second block of transformed symbols.

5. The method of claim 4, wherein the block of data symbols consists of twelve data symbols, and the step of transforming said block of twelve data symbols comprises:
   dividing the block of twelve symbols into a first sub-block of six symbols and a second sub-block of six symbols;
   applying a DFT of size six to the first sub-block of six symbols to produce the first block of transformed symbols; and
   applying a DFT of size six to the second sub-block of six symbols to produce the second block, of transformed symbols.

6. The method of claim 1, wherein
   the step of transmitting the first block of transformed symbols comprises mapping each symbol within the first block of transformed symbols to a particular subcarrier within the first set of subcarriers and applying an inverse fast Fourier transform (IFFT) to the first block of transformed symbols; and
   the step of transmitting the second block of transformed symbols comprises mapping each symbol within the second block of transformed symbols to a particular subcarrier within the second set of subcarriers and applying the IFFT to the second block of transformed symbols.

7. The method of claim 1, further comprising
   producing a second block of data symbols;
   transforming said second block of data symbols to produce a third block of transformed symbols and a fourth block of transformed symbols;
   using the first antenna, transmitting the third block of transformed symbols and the first reference sequence, wherein the transmitting step occurs during a second slot of the subframe; and
   using the second antenna, transmitting, during the second slot, the fourth block of transformed symbols and the second reference sequence, wherein
   the third block of transformed symbols is transmitted using a fourth set of subcarriers, and
   the fourth block of transformed symbols is transmitted using a fifth set of subcarriers that is orthogonal with the fourth set of subcarriers.

8. The method of claim 7, wherein
   the first and fifth sets of subcarriers consist only of even indexed subcarriers and the second and fourth sets of subcarriers consist only of odd indexed subcarriers, or
   the first and fifth sets of subcarriers consist only of odd indexed subcarriers and the second and fourth sets of subcarriers consist only of even indexed subcarriers.

9. The method of claim 1, further comprising obtaining a block, of message bits, wherein the step of producing the block of data symbols comprising generating the block of data symbols from the block of message bits.

10. The method of claim 9, wherein the step of obtaining the block of message bits comprises:
   obtaining a sequence of message bits;
   encoding the sequence of message bits to produce an encoded sequence of message bits; and
   scrambling the encoded sequence of message bits to produce the block of message bits.

11. The method of claim 1, wherein
   the first set of subcarriers comprises a set of two or more orthogonal subcarriers,
   the second set of subcarriers comprises a set of two or more orthogonal subcarriers, and
   no subcarrier included in the first set of subcarriers is included in the second set of subcarriers.

12. The method of claim 11, wherein
the first set of subcarriers comprises a first subcarrier ($f_0$) and a second subcarrier ($f_2$), wherein $f_0$ and $f_2$ are orthogonal,
the second set of subcarriers comprises a third subcarrier ($f_1$) and a fourth subcarrier ($f_3$), wherein $f_1$ and $f_3$ are orthogonal,
the first set of subcarriers does not include $f_1$ or $f_3$,
the second set of subcarriers does not include $f_0$ or $f_2$,
subcarrier $f_1$ is positioned between subcarriers $f_0$ and $f_2$, and
subcarrier $f_2$ is positioned between subcarriers $f_1$ and $f_3$.

13. The method of claim 11, wherein
the first set of subcarriers consists of six different subcarriers $f_i$, where i=0, 2, 4, 6, 8, 10,
the second set of subcarriers consists of six different subcarriers $f_j$, where j=1, 3, 5, 7, 9, 11, and
$f_x$, is directly between $f_{x-1}$ and $f_{x+1}$, for x=1, 2, 3, 4, 5, 6, 7, 8, 9, 10.

14. A transmit diversity apparatus for discrete Fourier transform (DFT) precoded channels, the apparatus comprising:
a first antenna;
a second antenna; and
a data processor coupled to the first antenna and the second antenna, the data processor being configured to: (a) produce a block of data symbols from a set of message bits; (b) transform said block of data symbols to produce a first block of transformed symbols and a second block of transformed symbols; (c) use the first antenna to transmit, during a slot of a subframe of a radio frame, the first block of transformed symbols and a first reference sequence; and (d) use the second antenna to transmit, during said slot, the second block of transformed symbols and a second reference sequence, wherein
the data processor is further configured such that (a) the first block of transformed symbols is transmitted using only a first set of subcarriers, (b) the second block of transformed symbols is transmitted using only a second set of subcarriers that is orthogonal to the first set of subcarriers, and (c) the first reference sequence and the second reference sequence are transmitted using a third set of subcarriers that comprises that first set of subcarriers and the second set of subcarriers.

15. The apparatus of claim 14, wherein the first reference sequence is orthogonal to the second reference sequence.

16. The apparatus of claim 15, wherein the first reference sequence is a cyclic shift of the second reference sequence.

17. The apparatus of claim 14, wherein the data processor is further configured such that the data processor transforms said block of data symbols by:
dividing the block of data symbols into at least a first sub-block and a second sub-block;
applying a discrete Fourier transform (DFT) to the first sub-block to produce the first block of transformed symbols; and
applying a discrete Fourier transform (DFT) to the second sub-block to produce the second block of transformed symbols.

18. The apparatus of claim 17, wherein the block of data symbols consists of twelve data symbols, and the data processor is further configured such that the data processor transforms said block of data symbols by:
dividing the block of twelve symbols into a first sub-block of six symbols and a second sub-block of six symbols;
applying a DFT of size six to the first sub-block of six symbols to produce the first block of transformed symbols; and
applying a DFT of size six to the second sub-block of six symbols to produce the second block of transformed symbols.

19. The apparatus of claim 14, wherein the data processor is further configured such that the data processor:
maps each symbol within the first block of transformed symbols to a particular subcarrier within the first set of subcarriers and applies an inverse fast Fourier transform (IFFT) to the first block of transformed symbols; and
maps each symbol within the second block of transformed symbols to a particular subcarrier within the second set of subcarriers and applies the IFFT to the second block of transformed symbols.

20. The apparatus of claim 14, wherein the data processor is further configured to:
produce a second block of data symbols;
transform said second block of data symbols to produce a third block of transformed symbols and a fourth block of transformed symbols;
use the first antenna to transmit, during a second slot of the subframe, the third block of transformed symbols and the first reference sequence; and
use the second antenna to transmit, during the second slot, the fourth block of transformed symbols and the second reference sequence, wherein
the data processor is further configured such that (a) the third block of transformed symbols is transmitted using a fourth set of subcarriers, (b) the fourth block of transformed symbols is transmitted using a fifth set of subcarriers, and (c) the fourth set of subcarriers is orthogonal with the fifth set of subcarriers.

21. The apparatus of claim 20, wherein
the first and fifth sets of subcarriers consist only of even indexed subcarriers and the second and fourth sets of subcarriers consist only of odd indexed subcarriers, or
the first and fifth sets of subcarriers consist only of odd indexed subcarriers and the second and fourth sets of subcarriers consist only of even indexed subcarriers.

22. The apparatus of claim 14, wherein the set of message bits comprises one or more HARQ feedback bits.

23. The apparatus of claim 22, wherein the set of message bits further comprises a scheduling request bit.

24. The apparatus of claim 22, wherein the HARQ feedback bits comprises bits obtained by a logical AND operation of several individual HARQ feedback bits.

25. A mobile terminal comprising a transmit diversity apparatus for discrete Fourier transform (DFT) precoded channels, the apparatus comprising:
a first antenna;
a second antenna; and
a data processor coupled to the first antenna and the second antenna, the data processor being configured to: (a) produce a block of data symbols from a bit sequence; (c) transform said block of data symbols to produce a first block of transformed symbols and a second block of transformed symbols; (d) use the first antenna to transmit, during a slot of a subframe of a radio frame, the first block of transformed symbols and a first reference sequence; and (e) use the second antenna to transmit, during said slot, the second block of transformed symbols and a second reference sequence, wherein the data processor is further configured such that (a) the first block of transformed symbols is transmitted using only a first set of subcarriers, (b) the second block of transformed symbols is transmitted using only a second set of subcarriers that is orthogonal to the first set of subcarriers, and (c) the first reference sequence and the second reference sequence are transmitted using a third set of subcarriers that comprises that first set of subcarriers and the second set of subcarriers.

* * * * *

UNITED STATES PATENT AND TRADEMARK OFFICE
CERTIFICATE OF CORRECTION

PATENT NO.       : 8,824,267 B2                         Page 1 of 2
APPLICATION NO.  : 13/016205
DATED            : September 2, 2014
INVENTOR(S)      : Cheng et al.

It is certified that error appears in the above-identified patent and that said Letters Patent is hereby corrected as shown below:

In the specification,

In Column 7, Line 13, delete "$10^{\square 2}$." and insert -- $10^{-2}$. --, therefor.

In Column 7, Line 15, delete "$10^{\square 2}$" and insert -- $10^{-2}$ --, therefor.

In Column 7, Line 16, delete "$10^{\square 3}$." and insert -- $10^{-3}$. --, therefor.

In Column 8, Line 5, delete "$N_{SF,0}^{PUCCh}$" and insert -- $N_{SF,0}^{PUCCH}$ --, therefor.

In Column 8, Line 18, delete "$d(NR_{SC}^{RB}-1)$" and insert -- $d(N_{SC}^{RB}-1)$ --, therefor.

In Column 8, Line 19, delete "$d(2NR_{SC}-1)$." and insert -- $d(2N_{SC}^{RB}-1)$. --, therefor.

In Column 8, Line 66, delete "$M_{SC}^{PUCH}=N_{SC}^{RB}$." and insert -- $M_{SC}^{PUCCH}=N_{SC}^{RB}$. --, therefor.

In Column 9, Lines 51-52, delete "symbols)" and insert -- symbols --, therefor.

In Column 9, Line 54, delete "symbols)" and insert -- symbols --, therefor.

In Column 11, Line 58, delete "sequences" and insert -- sequences. --, therefor.

In Column 12, Line 36, delete "block. This bit element long bit block. This" and insert -- block. This --, therefor.

In the claims,

In Column 14, Line 10, in Claim 5, delete "block," and insert -- block --, therefor.

Signed and Sealed this
Twentieth Day of October, 2015

Michelle K. Lee
*Director of the United States Patent and Trademark Office*

CERTIFICATE OF CORRECTION (continued)
U.S. Pat. No. 8,824,267 B2

In Column 14, Line 26, in Claim 7, delete "comprising" and insert -- comprising: --, therefor.

In Column 14, Line 51, in Claim 9, delete "block," and insert -- block --, therefor.

In Column 16, Line 59, in Claim 25, delete "sequence; (c)" and insert -- sequence; (b) --, therefor.

In Column 16, Line 62, in Claim 25, delete "symbols; (d)" and insert -- symbols; (c) --, therefor.

In Column 16, Line 65, in Claim 25, delete "and (e)" and insert -- and (d) --, therefor.